United States Patent [19]

Steinke et al.

[11] 4,369,748
[45] Jan. 25, 1983

[54] OPTICAL ENGINE KNOCK SENSING SYSTEM

[75] Inventors: Leo Steinke, Hepach; Ernst Linder, Mühlacker; Helmut Maurer, Vaihingen; Klaus Müller, Tamm; Franz Rieger, Aalen-Wasseralfingen, all of Fed. Rep. of Germany

[73] Assignee: Robert Bosch GmbH, Stuttgart, Fed. Rep. of Germany

[21] Appl. No.: 268,856

[22] Filed: Jun. 1, 1981

[30] Foreign Application Priority Data

Jun. 20, 1980 [DE] Fed. Rep. of Germany ....... 3023013

[51] Int. Cl.³ .................... F02P 5/04; F02B 3/00; G01K 21/26
[52] U.S. Cl. .................... 123/425; 123/478; 123/494; 73/35; 350/96.1
[58] Field of Search ............... 423/425, 419, 426, 478, 423/494; 73/3 J, 346; 250/227, 554; 350/96.10, 96.24, 61; 356/44, 241, 315, 417

[56] References Cited

U.S. PATENT DOCUMENTS

| | | | |
|---|---|---|---|
| 2,841,979 | 7/1958 | Harbert | 73/35 |
| 3,720,192 | 3/1973 | Aeno | 173/494 |
| 4,039,845 | 7/1977 | Oberhanshi et al. | 350/96.1 |
| 4,109,616 | 8/1978 | Zechnall et al. | 123/478 |
| 4,185,274 | 1/1980 | Giallorenzi | 350/96.1 |
| 4,290,398 | 9/1981 | Hallori et al. | 123/425 |

Primary Examiner—Raymond A. Nelli
Attorney, Agent, or Firm—Frishauf, Holtz, Goodman & Woodward

[57] ABSTRACT

A sensor (10) optically coupled to the combustion chamber (10') of an internal combustion (IC) engine is kept free from contaminating or dirt deposits, or the like, by subjecting the sensor to mechanical shocks or vibration. The mechanical shocks or vibration are obtained by the engine itself by controlling the engine to operate for a predetermined time period as set by a monostable flip-flop (FF) (18) under controlled knocking conditions, the shock waves within the combustion chamber causing flaking off or dropping off of contaminating deposits. Controlled knocking can be obtained by advancing ignition timing by additional control of an ignition system (19) in a direction of excessive spark advance, or overriding a knocking inhibiting system already present on the engine. The degree of contamination of the sensor can be determined, for example, by integrating the light received over a predetermined angle of rotation of the engine crankshaft and comparing this rotation with the amount of fuel supplied to the engine for combustion, for example by comparison with timing of a fuel injection pulse, or the like.

15 Claims, 2 Drawing Figures

OPTICAL ENGINE KNOCK SENSING SYSTEM

Reference to related applications, assigned to the assignee of this application, the disclosure of which is hereby incorporated by references:

U.S. Ser. No. 214,481, filed Dec. 9, 1980, MULLER et al.
U.S. Ser. No. 214,720, filed Dec. 9, 1980, LINDER et al.
U.S. Ser. No. 214,513, filed Dec. 9, 1980, MAURER et al.

The present invention relates to a system to determine knocking of internal combustion engines, and more particularly to a system in which contamination of an optical sensor located to optically monitor the combustion process in the combustion head of an internal combustion engine can be kept free from deposits interfering with light transmission of an optical-electrical transducer forming part thereof.

BACKGROUND

The referenced patent application Ser. No. 214,481, filed Dec. 9, 1980, MULLER et al, describes a sensor arrangement in which oscillations which occur upon knocking or premature combustion of the fuel-air mixture within the cylinder of an internal combustion engine are sensed. An optical receiver, for example a photo diode, photo transistor, photo resistor, or the like, is optically coupled to the combustion chamber. Coupling can be effected by a glass rod, for example passed through an electrode of a spark plug, or by embedding light guide fibers or light guide fiber cables in a suitable location in the combustion chamber, so that the light guide fibers or cables will pick up light generated upon combustion. In accordance with the disclosure of this application, the light guide fibers or cables can be placed within the cylinder head gasket, and suitably terminated at the cylinder opening, or passed across the cylinder head opening.

The referenced application Ser. No. 214,720, filed Dec. 9, 1980, LINDER et al, describes a sensor arrangement in which a window is located at a portion of the inner wall of the combustion chamber, the window being formed at the side facing the combustion chamber with a contoured, preferably outwardly bulged or bowed shape, the contour forming edges, points, or the like, so that the contoured surface will be substantially larger, and interrupted, than a projected surface of the window itself. The combustion gas flows past the combustion chamber so that, upon swirling of the combustion gases, deposits which may accumulate on the window are cleaned off. A coating, for example of silver, can be applied to the surface of the window exposed to the combustion chamber to additionally assist in cleaning thereof.

The referenced application Ser. No. 214,513, filed Dec. 9, 1980, MAURER et al, describes a sensor arrangement in which a receiver is placed behind a chamber which extends from the combustion chamber and is open thereto. The receiver is formed as a unitary plug, which can be screwed into an opening formed in the cylinder head, for example, the chamber being closed off by a light transmissive window. An optical receiver can be located either directly behind the light transmissive window or a light guide can be coupled to the window for remote positioning of an optical transducer. A filter can be interposed between the window and the light guide, the filter being arranged to be responsive to specific spectral lines occurring during combustion, for example responsive to CO, HC, or OH components, with separate evaluation transducers being connected to the respective filters which, in turn, are connected to a comparator or divisor circuit, so that a quotient of signals representative of the respective spectral components is obtained, thus eliminating amplitude variations from the resulting output.

THE INVENTION

It is an object to improve the light transmission to an electro-optical transducer by removing contaminants which interfere with this light transmission from the surface of the light receiver, which may be a window, a fiber terminal, a glass rod, or the like, that is to remove an opaque coating from the sensor surface through which light is to be transmitted so that, to the extent possible, the light flux will remain high and the light transmission surface will be kept reasonably clean.

Briefly, the system provides for causing mechanical shocks or vibrations or quakes at the receiver in order to loosen any contaminating deposits; these shocks or vibrations may be caused, for example, by deliberately causing engine knocking under controlled conditions.

In accordance with a preferred embodiment, the optical receiver provides an output signal which is processed, by utilizing signals which are already available in modern motor vehicles to adjust the ignition instant, under controlled conditions, to ignition advance on and beyond that commanded by the operating conditions of the vehicle to thereby, and for a controlled period of time and to a controlled extent, cause mechanical disturbances by initiating at least one combustion event under engine knocking conditions. The mechanical shocks which are thereby generated can be caused by deliberately interfering with a knocking sensor and knock sensing prevention system if the signal level which is sensed by the knocking sensor has dropped below an acceptable level.

In accordance with a feature of the invention, indicator means can be provided which furnish an output signal if the degree of contamination has not changed in a desired manner after the controlled shocks had occurred. The indicator, thus, will then show that cleaning of the respective knocking sensor element or its replacement should be undertaken.

The system has the advantage that no interference from outside of the engine need be made with the knock sensing detector or sensor itself; cleaning is accomplished by modification of engine operation.

DRAWINGS

Knocking of an internal combustion engine results in a shock wave within the combustion chamber; the shock wave occurs in form of an intense gas oscillation which is accompanied by changes in brightness. These changes in flame brightness can be sensed by a light sensitive sensor located within, or being optically exposed to, the combustion chamber. Sensor arrangements of this kind are known, see for example the above referenced patent applications, the disclosure of which is hereby incorporated by reference.

Optical sensors positioned to sense knocking of internal combustion engines have the problem that, during continued operation of the engine, and hence of the sensor, deposits will form at the portion of the sensor facing the interior of the combustion chamber. These deposits, carbon particles, contaminants within the fuel, or the air, or the like, generally reduce the light flux reaching the photoelectric elements which form part of the sensor. For example, a glass window may be formed or placed in light transmitting relationship with respect to the combustion chamber, and deposits thereon, which may be more or less opaque, have the tendency to reduce light passing through the deposit, and hence through the window, to the photoelectric elements, which is the actual sensor transducer. Decrease in the light flux may result in distortion and change in the electrical signals and, in extreme cases, the light flux passing through the contaminating layer will become so small that no response from the sensor will be obtainable at all anymore.

Figure 1:
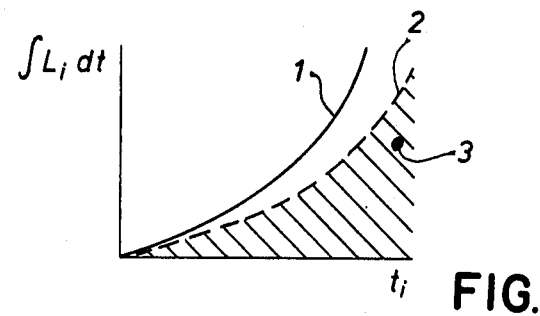
FIG. 1 is a graph illustrating the relationship of light (ordinate) with respect to fuel injection time of fuel supply of a fuel injected gasoline automotive engine.

The light flux or total quantity of light $L_i$ which reaches the sensor arrangement during a predetermined angle of rotation of the main crankshaft of the engine can be measured. The light flux is integrated over that angle of rotation, and the thus obtained integral $\int L_i dt$ can be related to a fuel injection time $t_i$ of the internal combustion engine—assuming that it is fuel injection operated. An approximately parabolic relationship is obtained, see cure 1 of FIG. 1. This relationship can be determined for any specific type of internal combustion (IC) engine. By measuring the integral of light being received over a certain crankshaft angle, and comparing this value with a weighted fuel injection time, data can be obtained containing the information whether the light which receives the sensor corresponds to a desired or commanded light integral, or if already a certain portion of the light has been absorbed by a contaminating layer on the sensor itself. A limiting curve 2 can be drawn, positioned below the curve 1, which corresponds to a predetermined degree of contamination or dirt deposit on a sensor, which is still tolerable, that is, which provides output values which can still be unambiguously analyzed. If it is determined, for example, upon comparing an integrated light quantity and the weighted fuel injection time in accordance with the graph 1 of FIG. 1, that the output falls at a location of point 3, that is, within the cross-hatched field of FIG. 1, then it will be clear that the still permitted degree of contamination of the sensor has been exceeded. This output information then can be used to provide for cleaning of the window. In accordance with a feature of the present invention, the window is then cleaned by causing a mechanical shock or shock wave to be applied to the sensor, which causes flaking off, or burning off, or shaking off contaminating deposits.

In accordance with a feature of the invention, the mechanical shock to which the sensor is subjected is, itself, caused by generating a shock wave within the combustion chamber, that is, by artificially causing the engine to knock, for example during one combustion cycle in any one cylinder head, but doing so under controlled conditions, so that the degree of knocking will be so slight as not to interfere with the integrity of the engine or its continued operation.

Figure 2:
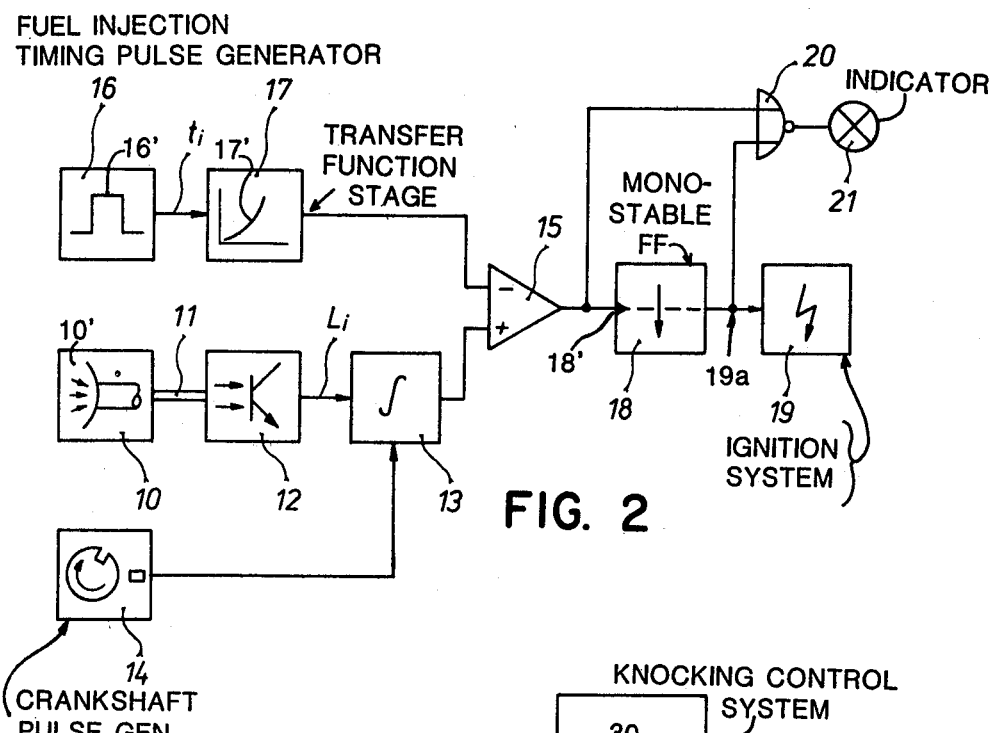
FIG. 2 is a block circuit diagram illustrating the system in highly schematic form.

The system of FIG. 2 provides for analysis of the light output from the light sensor and, additionally, is arranged to artificially cause the engine to knock.

An optical sensor 10 is located within the combustion chamber 10' of the engine—not further shown. The light which occurs upon ignition of a fuel-air mixture applied to the combustion chamber is sensed by a photoelectric transducer 12; it is applied from the sensor 10 to the photoelectric transducer 12 by a light guide, for example a light fiber cable 11. The photoelectric transducer 12 can be any suitable element and is shown, by way of example, as a photo transistor. The output signal from photo transistor 12 is applied to an integrator 13. Integrator 13 is caused to integrate in accordance with pulses derived from a pulse transducer 14, which is coupled to the crankshaft of the IC engine. The pulse transducer provides pulses representative of crankshaft angle. The output signal from the integrator 13 is applied to a positive input of a comparator 15. The negative input of the comparator 15 is connected to a fuel injection timing generator 16 providing fuel injection pulses 16' to a fuel injection system—not shown—of the IC engine, and which may be of any suitable type. The fuel injection system injects fuel into the air stream being supplied to the cylinder or cylinders of the IC engine, as well known. The output from the fuel injection pulse generator 16, that is, pulse 16' having the timing interval $t_i$ is applied to a transfer function stage 17 which is connected to the negative terminal of the comparator 15. The output of the comparator 15 is connected to a dynamic input of a monostable flip-flop (FF) 18, the output of which is connected to an ignition system 19. The ignition system 19 provides ignition timing signals to the ignition spark plugs of the IC engine. The input and the output, respectively, of the monostable FF 18 are connected to the inputs of a NOR-gate 20. The output of the NOR-gate is connected to an indicator 21. The ignition system 19 is shown merely as a single block but may include, of course, an ignition signal computer which receives inputs, for example, from the crankshaft transducer 14 to compute an exact ignition instant with respect to an ignition angle of a piston with respect to top dead center (TDC) position thereof, in accordance with load, speed, and such other parameters as may be considered. Such electronic ignition systems are well known, and any suitable system may be used.

Operation: The crankshaft pulse generator 14 provides timing pulses to control operation of the integrator 13. In one example, a full revolution of the crankshaft can occur between timing pulses supplied by the generator 14. The integrator 13 integrates during occurrence of two timing pulses, and then resets. During the integration period, the integrator 13 integrates the electrical signal representative of the light flux applied to the sensor 10, and conducted to the transducer 12. The integral which is so obtained is compared in the comparator 15 with a signal related to the fuel injection period $t_i$. The signal $t_i$ is processed in the transfer function stage 17, in which it is transformed in accordance with a curve 17'. The curve 17' can be stored, for example, in a read-only memory, or a programmable read-only memory (PROM), and may correspond, for example, to a function similar to function 2 of FIG. 1. Upon weighing the signal corresponding to the fuel injection time, a coordinate value will be obtained corresponding to any one controlled fuel injection time which corresponds to a coordinate value determined by the function 2 of FIG. 1. Comparison of the two values in comparator 15 then provides data whether the then pertaining operating point is above curve 2 in FIG. 1, or below curve 2 in FIG. 1. If the degree of dirt deposition or contamination of the sensor exceeds a predetermined value, the output of comparator 15 will switch to zero voltage. The dynamic input of the monostable FF 14 is so designed that, upon transition from a 1-signal to a 0-signal at the input, the FF will be SET and provide an output signal for a predetermined period of time, in accordance with the unstable timing of the FF 18. The output signal from FF 18 is applied to the ignition system 19 to cause, for that predetermined period of time corresponding to the unstable period, an ignition timing which is advanced over that otherwise determined by the other operating data of the engine, and computed by the ignition system. This additional or excessive advance will cause knocking of the IC engine. Consequently, the sensor will be subjected to shock or vibration, resulting in dropping off and flaking off of contaminating deposits. After the unstable time of the monostable FF has elapsed, the output thereof returns to quiescent or zero potential, and the ignition system 19 is no longer controlled to carry out an additional ignition advance, and the commanded knocking operating conditions are terminated. The timing of the FF 18 can, of course, be so adjusted with respect to the engine under consideration that the degree of knocking is completely controlled, so that the shocks introduced into the engine are predetermined and occur under controlled conditions, rather than at random.

It may occur that the commanded and controlled knocking events were not sufficient to remove contaminants deposited on the sensor, for example due to excessive adhesion thereon. This will result in the output of the comparator 15 remaining at zero voltage. This does not, however, continue to hold the monostable FF 18 in SET condition, or cause resetting thereof, since its input 18' is a dynamic input. The monostable FF can only provide a further ignition advance signal to the ignition system if the output of the comparator 15 has been reset to a positive voltage, that is, if the contaminants have been removed, so that the integrated value applied to the comparator 15 at the direct or positive terminal is in excess of that applied to the negative terminal by the function stage 17.

If the controlled, commanded knocking operating conditions or events were not sufficient to clean the sensor 10, an indicator is provided to indicate to the operator that the sensor 10 requires maintenance. To so indicate, the NOR-gate 20 and indicator 21 are provided. If, as stated, the output of comparator 15 remains at zero potential, and the output of the monostable FF 18 again also drops to zero voltage after its unstable time is terminated, the two inputs of the NOR-gate 20 will have zero voltage thereon, thus indicating conjunction, and indicator 21 will provide an output indication alerting the operator to take corrective action with respect to the knocking sensor 10. The indicator 21 thus will provide an output signal to the operator that the degree of contamination or dirt on the sensor has exceeded a permissible level and other measures must be taken in order to insure proper operation of knock sensing of the IC engine.

The block circuit diagram of FIG. 2 is only one example of a sensing arrangement which may be used to command shocks in order to clean the sensor. For example, and in accordance with another suitable embodiment of the invention, the transfer function stage 17 can be connected to accept the output of the integrator 13, and the fuel timing unit 16 can then be directly connected to the comparator 15.

The sensing cleaning effect, in accordance with the present invention, can be used also, and very desirably, with IC engines which include a knock sensing system providing an output signal for control thereof which is monitored to determine if the knocking signals exceed a predetermined reference value. The output of the monostable FF 18 can then be connected to the stage which generates the reference level, and, if the monostable FF SET, the reference level is raised. Thus, the knocking sensor system, for the duration of the unstable time of the monostable FF 18, will become effective only if the knocking signal exceeds this higher reference level, so that, during the time that the monostable FF 18 has been SET, knocking with predetermined amplitude—that is, amplitude below the now higher reference level—is permitted.

Figure 3:
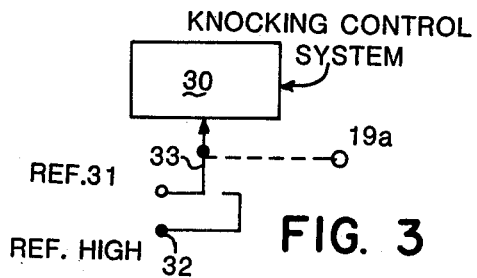
FIG. 3 is a fragmentary schematic diagram illustrating another embodiment.

FIG. 3 illustrates an already existing knocking control system 30, which may be of any suitable type known in the art, and having a reference signal from a terminal 31 applied thereto which determines the knocking level set of the system 30. In accordance with the present invention, a second reference terminal 32, referred to as "reference-high", is provided, and a transfer switch 33 is positioned in the line between the normal reference terminal 31 and the reference-high terminal 32, the position of switch 33 being controlled by the output from the monostable FF 18, taken for example at terminal 19a. Known and usual knocking control systems are customarily so arranged that, upon sensing of knocking or incipient knocking upon comparison of a knocking signal with the reference on terminal 31, the ignition is controlled to be retarded. Thus, upon raising the reference level, knocking—to a controlled extent—will be actually permitted, the degree of rise in the reference determining the degree of knocking which may occur before the already present knocking control system commands retardation of ignition. The invention has been illustrated in connection with a fuel injection system; other systems to compare an integrated signal of light occurring during the combustion of the fuel-air mixture with the quantity of fuel being supplied may be used. The quantity of fuel, or of the fuel-air mixture, respectively, of course will determine the degree of intensity of the flame upon combustion thereof.

Various changes and modifications may be made, and features described in connection with the embodiment can be used with any other features disclosed herein, within the scope of the inventive concept.

We claim:
1. Optical knock sensor system having
an optical receiver-transducer (10, 11, 12) exposed to and receiving light occurring upon combustion of a fuel-air mixture in the cylinder of an internal combustion (IC) engine, and furnishing an electrical output signal ($L_i$) representative of sensed light;
means (13–17) sensing contamination of the receiver due to deposits on the receiver in the course of operation of the IC engine and providing a contamination output signal;
and means (18, 19; 30, 32, 33) controlling operation of the engine to cause the engine to operate under controlled knocking condition to thereby produce shock and oscillation waves in the combustion chamber and remove contaminants from the receiver.

2. System according to claim 1, wherein the contamination sensing means comprises integrating means (13) integrating the output signal from said receiver over a predetermined crankshaft angle of the IC engine; and including means (16, 17) providing a signal representative of fuel being supplied to the engine to rotate the engine;

and a comparator (15) comparing said integrated light-representative output signal with the fuel-representative signal and providing an output signal to control said operating control means (18, 19) if the integrated light signal is below a level representative of light which should be obtained from a fuel-air mixture under the then pertaining quantity of fuel being supplied to the engine.

3. System according to claim 2, wherein the fuel is supplied to the engine by a fuel injection system having a fuel injection timing means (16) and providing a fuel injection timing pulse (16′);

and said comparator (15) compares a functional relationship of said fuel injection timing pulse with a functional relationship of said integrated light pulse to determine whether the light-fuel relationship is above or below a predetermined level.

4. System according to claim 3, further including a transfer function stage (4) having a predetermined transfer function and connected in advance of said comparator (15) to one of the input signals thereto to modify the respective input signal in accordance with said functional relationship.

5. System according to claim 1, further including a knocking control system (30) connected to the IC engine, said knocking control system having reference means (31) and determining knocking events with respect to said reference and, upon such determination, commanding the ignition system to retard ignition;

and wherein said operating control means (18, 19) includes means (19a, 32, 33) raising the reference level at which ignition retardation is commanded by said knocking control system (30).

6. System according to claim 1, wherein said operating control means comprises an ignition system (19) having variable ignition timing, and including means (18) shifting said ignition timing towards spark advance for a limited period of time upon sensing of contamination of the receiver.

7. System according to claim 1, wherein said engine operation control means (18, 19) includes a timing element (18) permitting engine operation under knocking condition for a limited timing duration determined by said timing element only.

8. System according to claim 7, wherein said timing element comprises a monostable flip-flop (18) having a dynamic input, said monostable flip-flop being connected to and controlled by said contamination sensing means (13–17) to provide a single timing duration signal upon receipt of a contamination output signal.

9. System according to claim 8, further including logic circuit means (20) connected to the monostable flip-flop (18) and providing an indicating signal if the contamination output signal persists after said limiting time duration determined by said timing element (18).

10. System according to claim 1, wherein the engine operating control means (18, 19) includes a timing element (18) controlling operation of the engine to cause engine operation under controlled knocking conditions for a limited time;

and logic means (20) and indicator means (21) connected to the logic means, and connected to and controlled by said timing element and to said contamination output signal to provide an indication if the contamination output signal persists beyond the time duration determined by said timing element.

11. Method to remove contaminating light attenuating deposits from an optical receiver in an internal combustion engine knock control system, in which the optical receiver comprises an optical receiver and transducer (10, 11, 12) exposed to and receiving light occurring upon combustion of a fuel-air mixture in the cylinder of the internal combustion engine, and furnishing an electrical output signal representative of sensed light, comprising the steps of sensing contamination of the receiver in the course of operation of the engine, and providing a contamination output signal;

and producing shock and oscillation waves in the combustion chamber of the engine to remove contaminating deposits from the receiver by controlling operation of the engine to cause the engine to operate under controlled knocking conditions, upon occurrence of a contamination output signal.

12. Method according to claim 11, including the step of limiting the time during which said step of causing the engine to operate under controlled knocking condition is carried out.

13. Method according to claim 11 or 12, wherein the step of causing the engine to operate under controlled knocking condition comprises advancing the spark timing of the engine under control of said contamination output signal.

14. Method according to claim 11 or 12, wherein the step of causing the engine to operate under controlled knocking condition comprises raising a knocking sensing reference level above a level at which knocking is about to occur to permit controlled knocking of the engine.

15. Method according to claim 11 or 12, wherein the step of providing said contamination output signal comprises sensing the quantity of fuel being supplied to the fuel-air mixture introduced to the engine;

sensing the generated light upon combustion of said fuel-air mixture;

deriving a signal ideally representative of light generated upon combustion of the quantity of fuel-air mixture supplied to the engine;

and comparing the actual light output sensed by the receiver with said derived signal representative of generated light, and providing said contamination output signal if the actual light signal and the derived signal do not have a predetermined relationship.

* * * * *